United States Patent [19]

Witzel et al.

[11] Patent Number: 5,012,348
[45] Date of Patent: Apr. 30, 1991

[54] TERMINAL DEVICE FOR PICTURE COMMUNICATION

[75] Inventors: Günther Witzel, Rödermark; Bruno Widmann, Stadecken-Elsheim; Franz Müller, Eppertshausen, all of Fed. Rep. of Germany

[73] Assignee: Telenorma GmbH, Frankfurt, Fed. Rep. of Germany

[21] Appl. No.: 479,538

[22] Filed: Feb. 13, 1990

[30] Foreign Application Priority Data

Feb. 27, 1989 [DE] Fed. Rep. of Germany ... 8902287[U]

[51] Int. Cl.[5] .............................................. H04N 5/30
[52] U.S. Cl. ..................................... 358/229; 358/85; 354/293
[58] Field of Search ..................... 358/229, 85, 87; 352/242, 243; 379/53; 354/293, 292

[56] References Cited

U.S. PATENT DOCUMENTS 4,258,387  3/1981  Lemelson et al. ................. 358/85
4,538,992  9/1985  Summerfield ...................... 434/38
4,579,436  4/1986  Jaumann ........................... 354/293
4,831,455  5/1989  Ishikawa et al. .................. 358/229
4,856,045  8/1989  Hoshina ............................ 379/53
4,888,795 12/1989  Ando et al. ....................... 379/53

OTHER PUBLICATIONS

Teleconference, vol. 6, No. 6, pp. 20–27, New Products and Services for 1988—Results of Telecom VII.

Primary Examiner—Howard W. Britton
Assistant Examiner—Safet Metjahic
Attorney, Agent, or Firm—Jacobson and Johnson

[57] ABSTRACT

The invention concerns a terminal device for picture communication, having a picture screen and a video camera for image transmission of the participant and for photographing of documents, drawings, plans, etc., with the video camera capable of being pivotably positioned vertically corresponding to the picture to be photographed and being mounted at the end of a swivel arm that is horizontally adjustable to different positions.

8 Claims, 4 Drawing Sheets

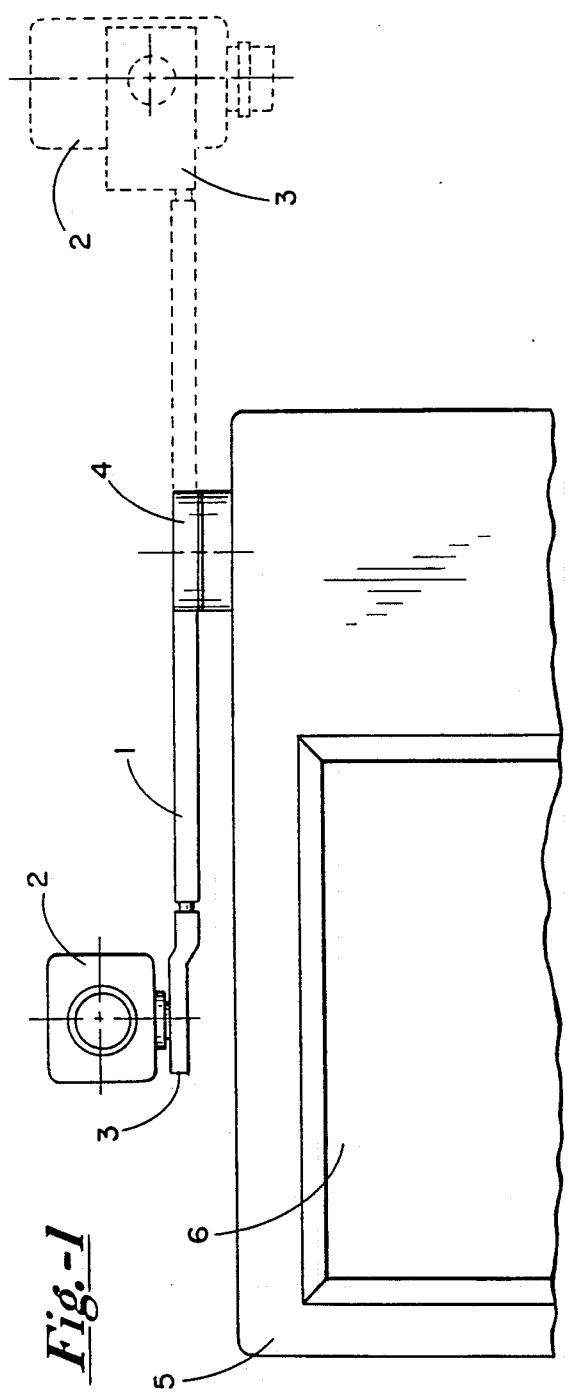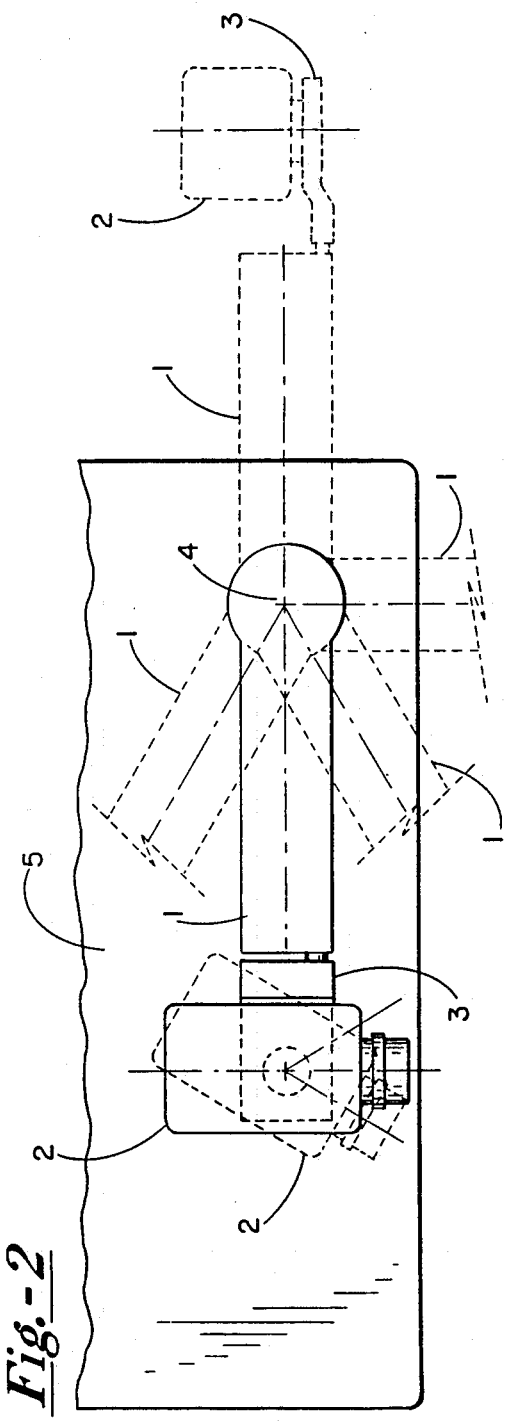

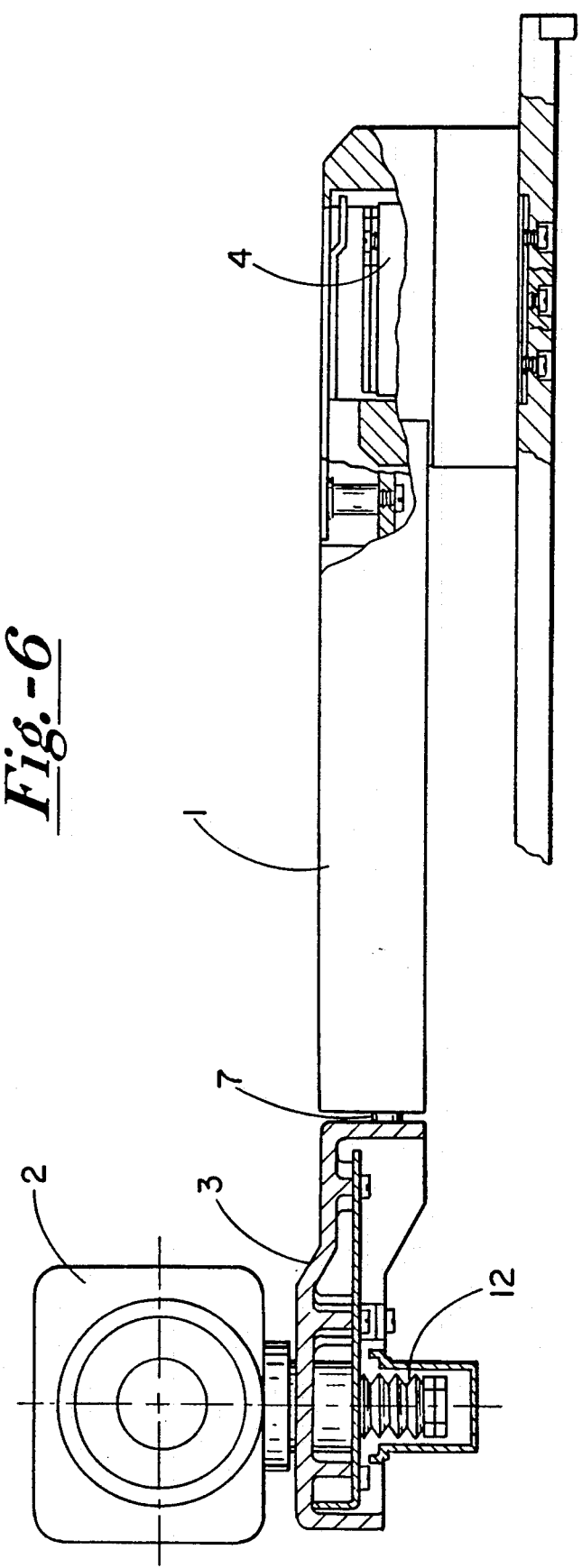

TERMINAL DEVICE FOR PICTURE COMMUNICATION

FIELD OF THE INVENTION

The invention concerns a terminal device for picture communication, having a picture screen and a video camera for image transmission of the participant and for photographing of documents, drawings, plans, etc., with the video camera capable of being pivotably positioned vertically corresponding to the picture to be photographed and being mounted at the end of a swivel arm that is horizontally adjustable to different positions.

DESCRIPTION OF THE PRIOR ART

Known from prior art is a participant device for picture-phoning where the video camera is movably disposed on a guide. This prior art is capable of transmitting between the parties in the picture conversation located at different sites to the video images of the participants along with video pictures of documents such as drawings and plans and physical objects or contrivances, etc., without the need for a second video camera at each site. In general the objective of the video camera is directed straight at or perpendicularly to the working surface and, in the position shown in FIG. 4, can directly photograph drawings, plans, objects, etc., located on said working surface. If the image of one party is to be transmitted to the other party in the picture conversation, the video camera must be pushed backwardly on a guide consisting of two rails, over a mirror, so that the image of the participant can be photographed. In this kind of arrangement the video camera can only be placed or fixed in one of two positions. Where an object is to be photographed in one of the camera positions, it must be brought into the correct position. In the other camera position where the image of the party in the conversation is to be transmitted, the person doing the photographing must himself set the video camera into the viewing direction. Hence, it would be advantageous if the video camera could be moved over a much wider range of positions, within certain limits. For this purpose this invention provides a universally adjustable pivot arm that carries the video camera.

SUMMARY OF THE INVENTION

The object of the invention consists of embodying the arrangement of the video camera in a terminal device for picture communication such that its shooting angle can be varied widely in each position.

This objective is met by mounting at the end of a pivot arm, which can be swung 180°, a camera plate accommodating the video camera which can be rotated vertically in stepless or continuous fashion with respect to the pivot arm and the camera horizontally pivotably mounted on the camera plate. Obtained with this is the advantage that with each position of the pivot arm the video camera can be optically adapted, about its perpendicular axis as well as in its inclination, to the person to be photographed, or to an object to be photographed. The correct adjustment can be easily made and checked on the picture screen when switching over to one's own image.

Other advantages will become apparent after reading the description.

BRIEF DESCRIPTION OF THE DRAWINGS

An embodiment of the invention will now be explained in more detail with the aid of the following drawings in which:

FIG. 1 shows a portion of a front view of the terminal device for picture communication;

FIG. 2 shows a top view of the terminal device;

FIG. 6 is a sectioned side view showing construction details of the pivot arm and the camera plate.

DESCRIPTION OF THE PREFERRED EMBODIMENTS

Figure 3:
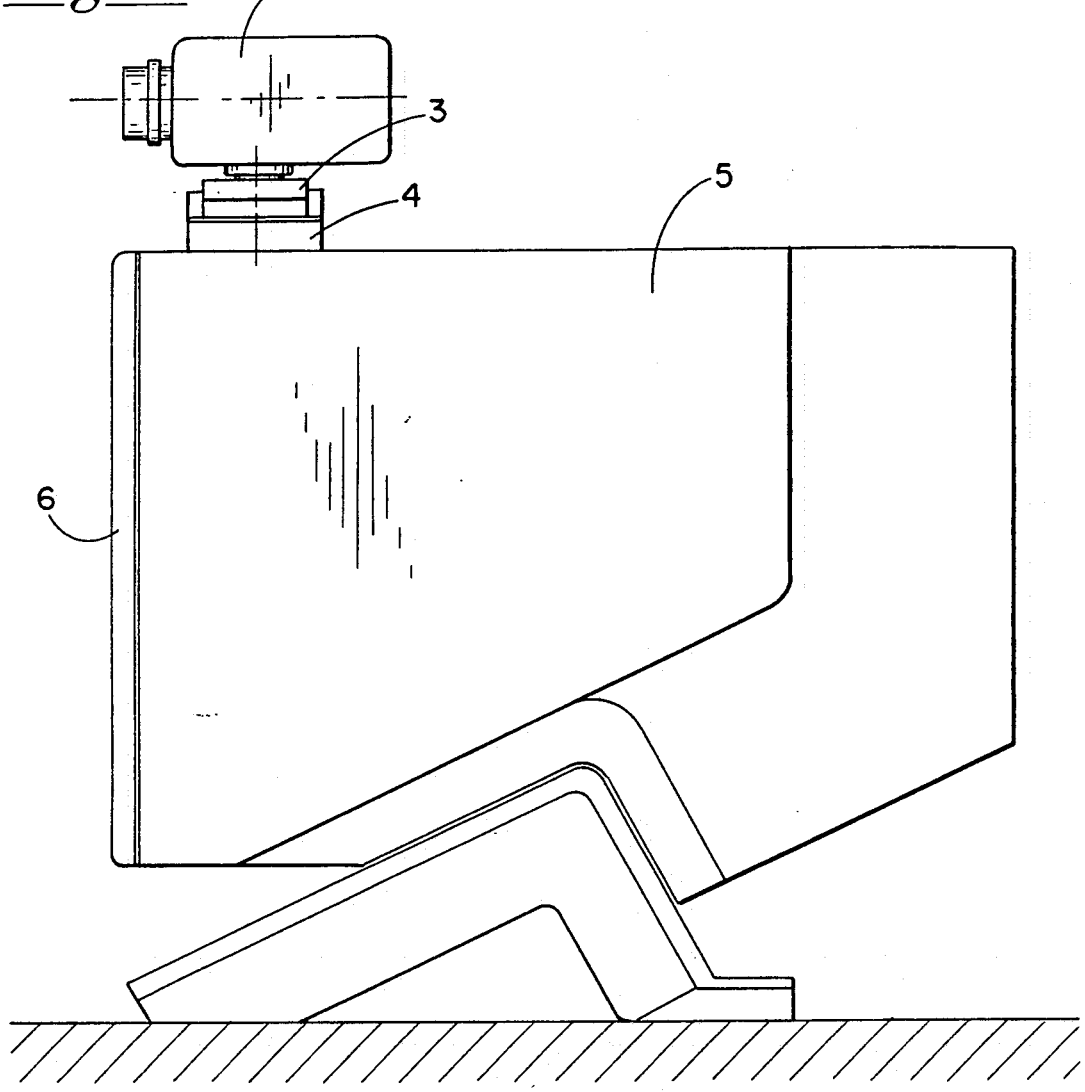
FIG. 3 shows a side view of the terminal device.

Represented in FIG. 1 is how a pivot arm 1, at whose end is mounted the video camera 2 on a camera plate 3, is attached to a point of rotation 4 on housing 5. The pivot arm 1 can be positioned in any arbitrary position, up to 180 degrees, about swivel 4 as shown by the solid line and dashed line representations. However, preferably stop settings are provided (FIG. 5) so that at some preferred positions, e.g., over the center axis of the picture screen, the pivot arm location can be held in place. This is indicated by broken lines in the top view represented in FIG. 2. Also represented in FIG. 2 is that the video camera 2 attached to the mounting plate 3 can be rotated horizontally with respect to plate 3 in both directions by a predetermined angle. The camera swivel pieces are equipped with friction cup springs 12, see FIG. 6, so that once the video camera 2 is positioned it will remain in its set position until moved again. The friction of cup springs 12 tend to keep the camera from moving after it has been manually set to a desired position. Swiveling of the video camera 2 is also possible when the pivot arm 1 is rotated such that the video camera 2 is located outside the base of the terminal device housing 5, as is represented by dashed lines in FIG. 1. Here, there exists the possibility to photograph objects, within certain limits, from the side of housing 5.

Figure 4:
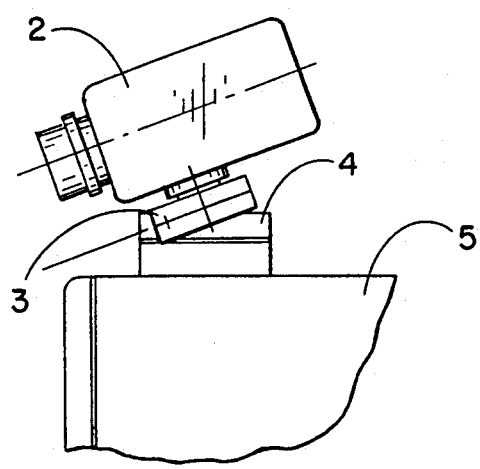
FIG. 4 shows the detail of the side view with tilted video camera.

Shown in the side view represented in FIG. 3 and front view of FIG. 1 is how the video camera, in the normal position, is located horizontally over the center of a video screen 6 within housing 5. The camera plate 3 can be manually set, by vertical pivoting, such that the video camera is inclined at an optimal photographing angle, as represented in FIG. 4.

The pivotable setting of camera plate 3 can likewise be undertaken in any other position of the pivot arm 1, so that virtually any favorable shooting angle can be set both horizontally and vertically.

Figure 5:
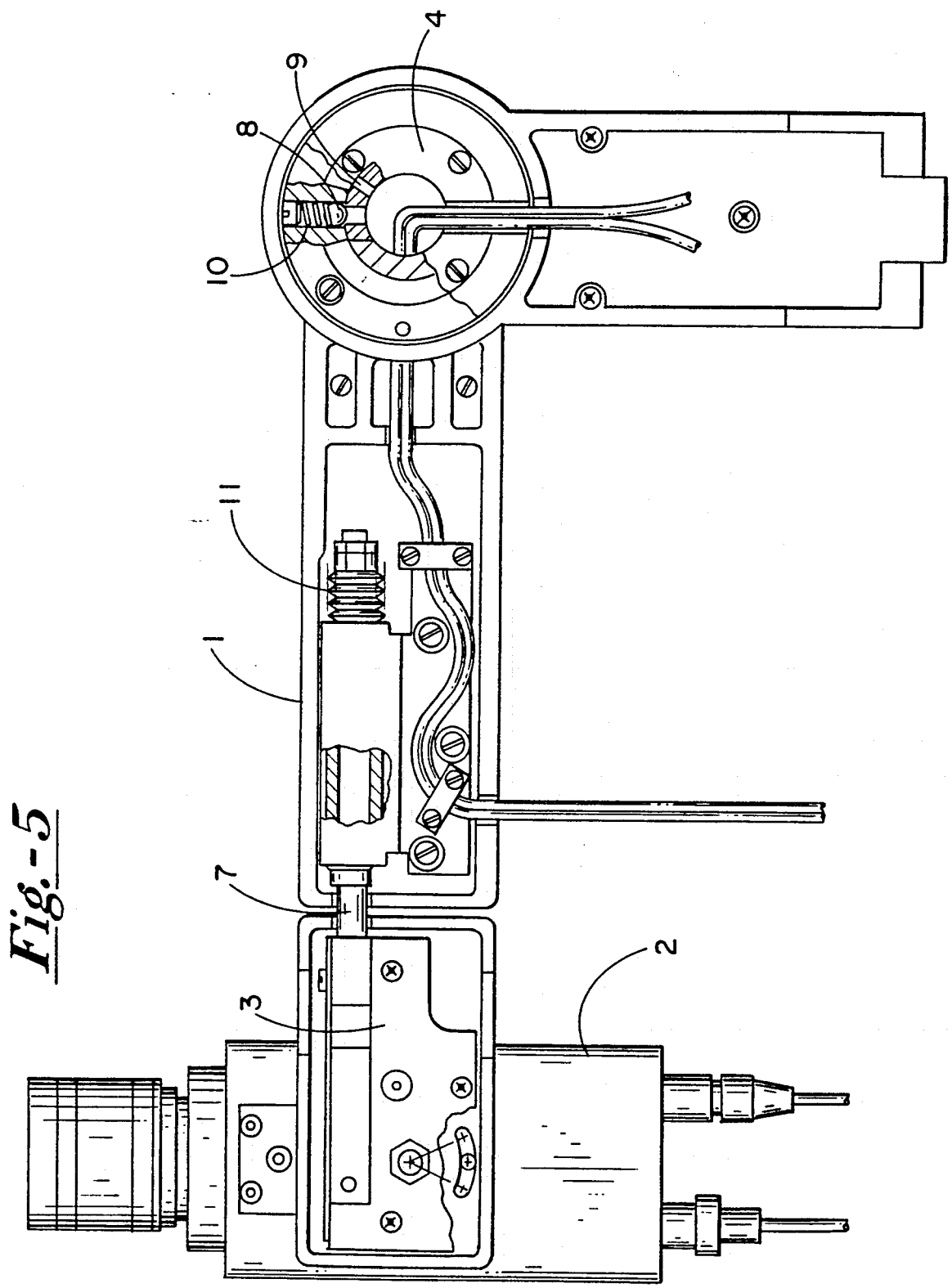
FIG. 5 is a sectioned top view showing construction details of the pivot arm.

Represented in detail in FIG. 5 is how balls 8 that are pressed into borings or holes 9 by springs 10 are disposed inside swivel or knuckle 4 of the pivot arm 1. The holes are located in the fixed part and are arranged such that different stop settings are provided for the pivot arm 1 but the pivot arm can be manually moved out of the stop settings. Additionally represented is how the camera plate 3 is pivotably journaled to the pivot arm 1 and how the video camera 2 is held thereupon. The rotating axle 7 is held in the pivot arm 1 with cup springs 11 such that the set inclination of the video camera is retained.

FIG. 6 shows a side view of the pivot arm 1, with the camera plate 3 attached thereto and the video camera 2 mounted thereupon such that the set horizontal angle can not be easily changed. This is achieved by means of a higher friction that is effected with the cup springs 12.

We claim;

1. Terminal device for picture communication, having a vertical picture screen enclosed in a housing having a horizontal top and bottom and vertical sidewalls and a video camera for image transmission of the participant and for photographing of objects and documents comprising:

an elongated pivot arm;

swivel means mounted on the top of the housing above the picture screen and attached to one end of said pivot arm for horizontally adjustably swinging said pivot arm in a 180 degree arc about a vertical axis;

a flat camera plate;

means rotatably mounting said camera plate to the other end of said pivot arm for adjustably swinging said camera plate in a vertical arc about a horizontal axes; and means rotatably mounting the camera on said camera plate for adjustably rotating the camera in an arc parallel to the plane of the camera plate about a third axis.

2. Terminal device according to claim 1, characterized by the housing mounted swivel means having several stop settings.

3. Terminal device according to claim 2, characterized by the stop settings in the swivel means comprise spring loaded balls pressed into recesses.

4. Terminal device according to claim 2, characterized by one stop setting of the swivel means positions the camera over the center of the picture screen.

5. Terminal device according to claim 2, characterized by one stop setting of the swivel means positions the camera beyond one side of the terminal device housing.

6. Terminal device according to claim 1, characterized in that said means rotatably mounting the camera on the camera plate includes cup springs for frictionally holding of the camera in its adjusted position with respect to the camera plate.

7. Terminal device according to claim 6 characterized in that said means mounting the camera plate to the pivot arm includes cup spring means for frictionally holding the camera plate in its adjusted position with respect to the pivot arm.

8. Terminal device according to claim 1, characterized by the range of vertical swing of the camera plate being at least 90 degrees.

* * * * *